July 11, 1944.   W. C. HEATH   2,353,465
MACHINE TOOL DRIVE SUPPORT
Filed Feb. 9, 1942   3 Sheets-Sheet 1

William C. Heath
INVENTOR.
BY
ATTORNEY.

July 11, 1944. W. C. HEATH 2,353,465
MACHINE TOOL DRIVE SUPPORT
Filed Feb. 9, 1942 3 Sheets-Sheet 3

William C. Heath
INVENTOR.

BY
ATTORNEY.

Patented July 11, 1944

2,353,465

UNITED STATES PATENT OFFICE 2,353,465

MACHINE TOOL DRIVE SUPPORT

William C. Heath, Shorewood, Wis., assignor to A. O. Smith Corporation, Milwaukee, Wis., a corporation of New York Application February 9, 1942, Serial No. 430,097

11 Claims. (Cl. 248—2)

This invention relates to a machine tool drive support and more particularly to a support for use with the invention disclosed in the co-pending application filed by the same inventor on February 9, 1942, Serial No. 430,098, for Machine tool drive unit.

One object of the present invention is to provide a support for a machine tool drive unit that may be adjusted to positions of different heights as well as laterally moved to different locations on a longitudinal plane parallel to the longitudinal axis of the drive unit with which it is employed.

Another object is to provide a support that is economically constructed and conveniently shipped and handled due to its light weight and compactness.

A further object is to provide a support that is readily assembled or disassembled with a machine tool drive unit and conveniently adjustable laterally and up and down by the operator of the driven machine.

Other objects will become apparent from the following description and accompanying drawings illustrating an embodiment of the invention.

Figure 1:
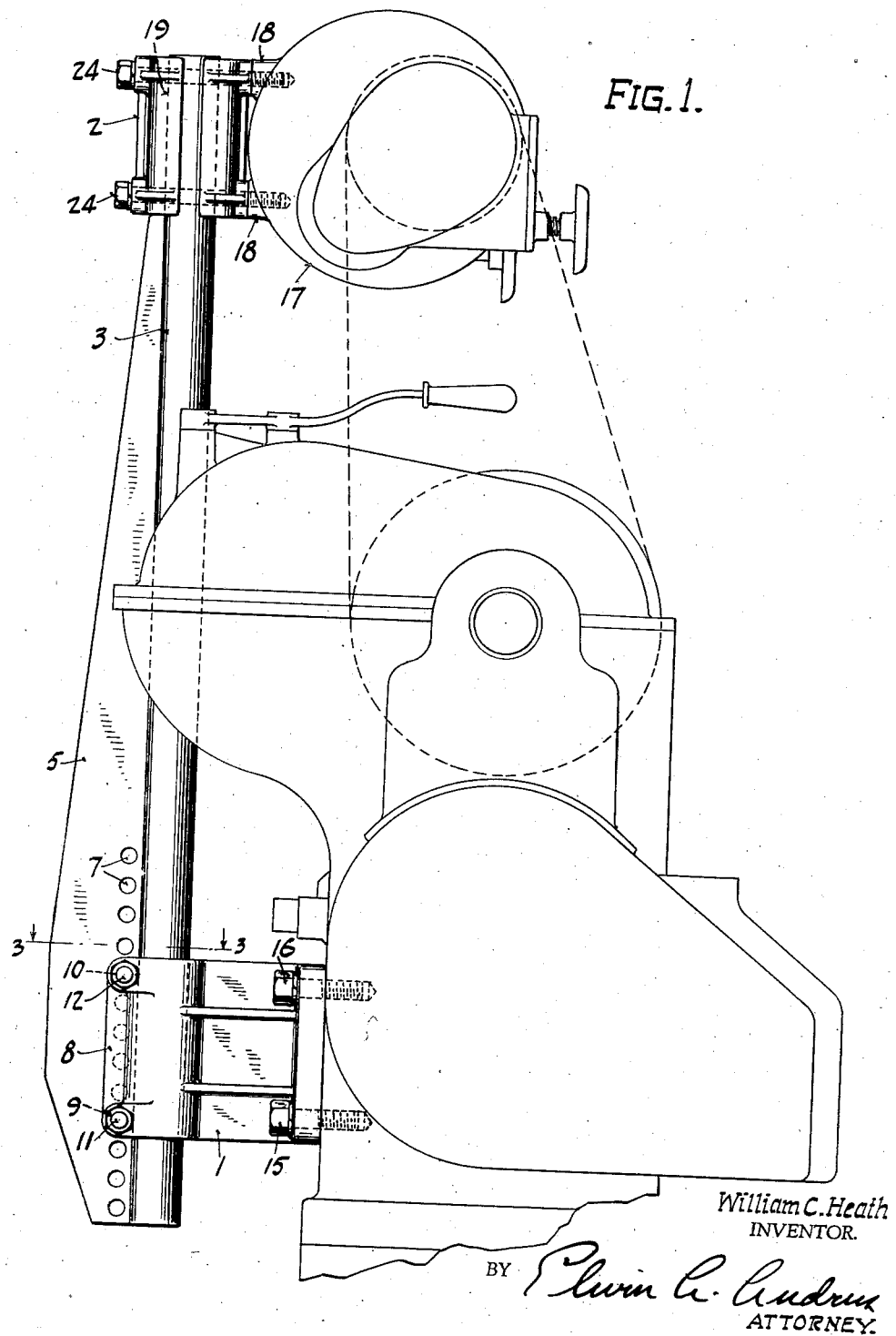
Figure 1 is a side elevational view of a machine tool drive support.
Figure 2:
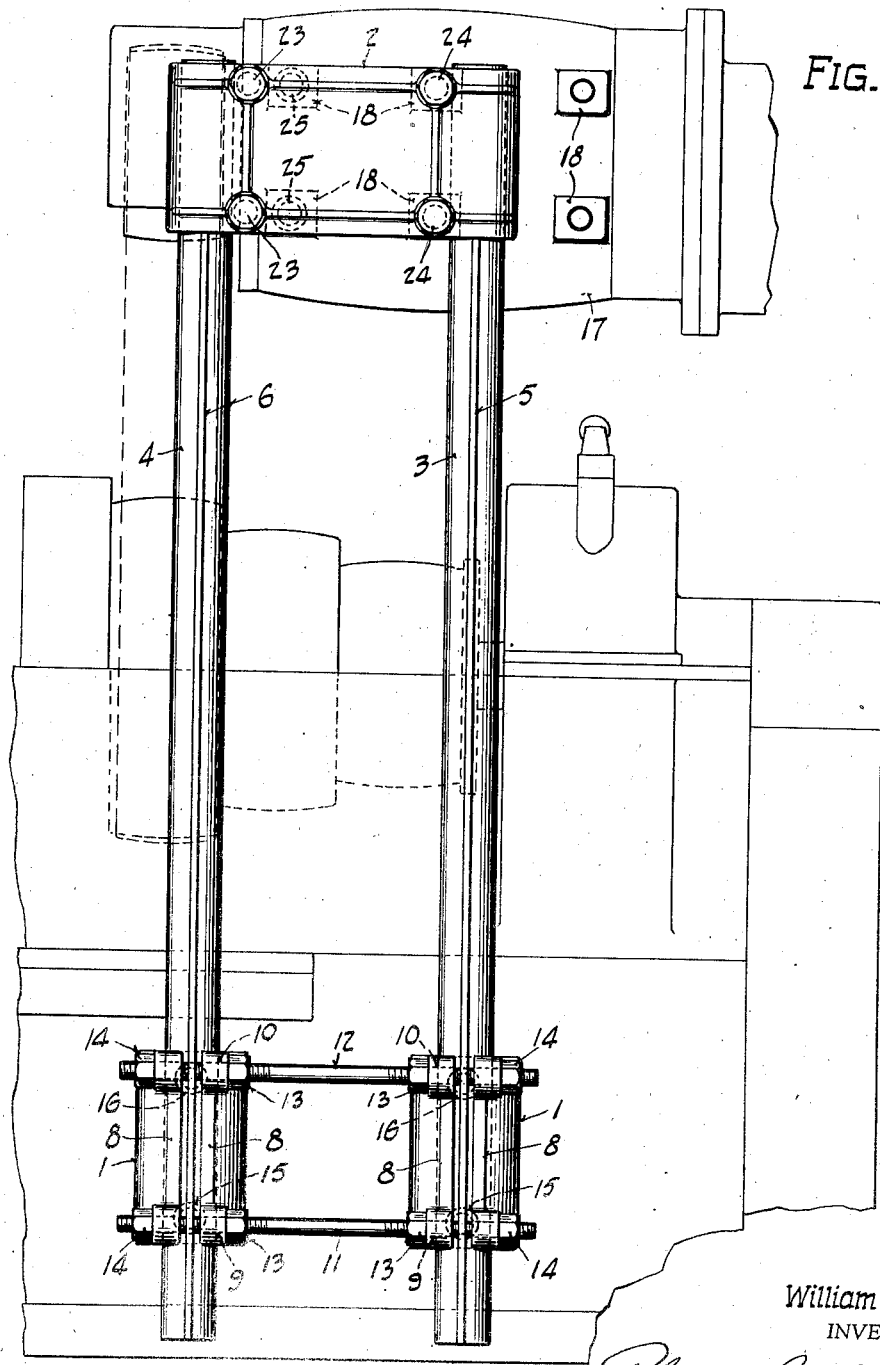
Fig. 2 is a side elevational view taken at right angles to that in Fig. 1.
Figure 3:
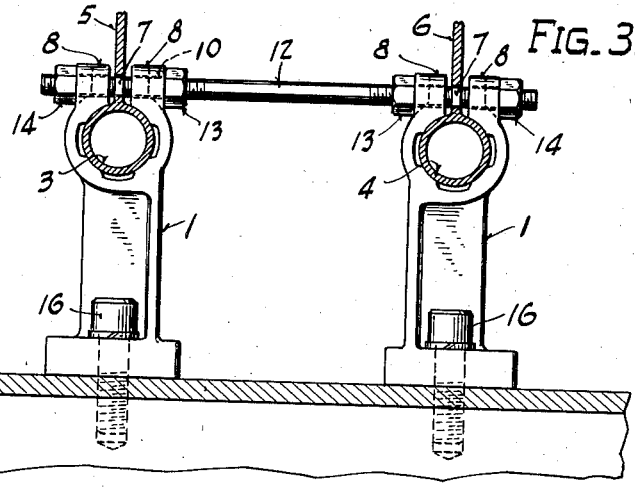
Fig. 3 is a section taken on line 3—3 of Fig. 1.
Figure 4:
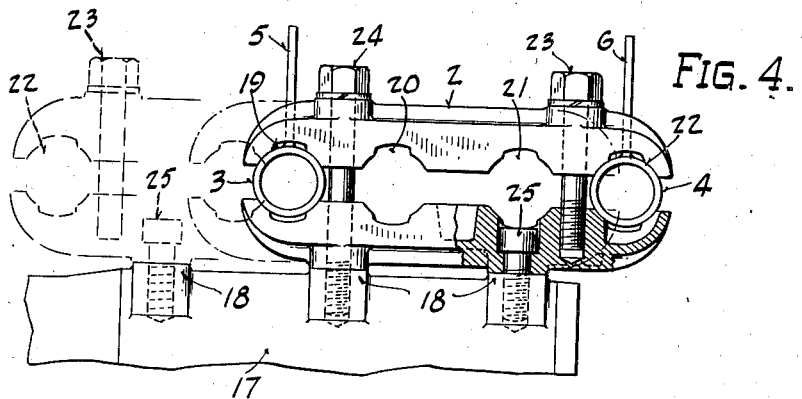
Fig. 4 is a top plan view partially in section.
Figure 5:
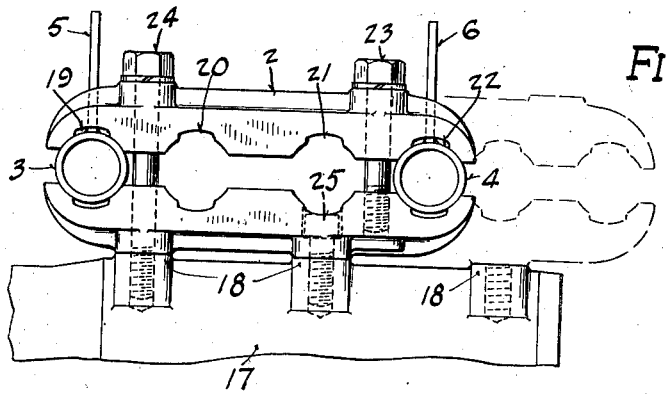
Fig. 5 is a similar top plan view of the machine tool support with the parts adjusted laterally to a different position.

Referring to the drawings, there is illustrated a machine tool drive support comprising lower bracket clamps 1 to be secured to a machine tool, an upper bracket clamp 2 to be secured to a machine tool drive unit, and upright support posts 3 and 4 disposed between the two bracket clamps. It will be understood that to facilitate the description, the various parts of the support are described hereafter as they appear and are disposed after assembly with a machine tool and drive unit.

The upright support posts 3 and 4 are preferably tubular pipe of the desired length or may be solid bars. The support posts 3 and 4 are disposed in an upright manner in parallel spaced positions between the bracket clamps 1 and 2 with their upper portions clamped by the bracket 2 and their lower portions clamped by the brackets 1.

The upright posts 3 and 4 are subjected to a substantial bending stress as well as torsion stress caused by the horizontal component of the pull of the belt passing around the pulley carried by the drive unit with which the support is employed.

To offset these forces the fins or struts 5 and 6 are secured in any suitable manner, such as by welding, to the upright support posts 3 and 4, respectively, on the sides of these members opposite to that from the machine with which the support is employed.

The structs 5 and 6 are substantially thin and have a gradually increasing width from one end to the other. The narrowest ends of the struts 5 and 6 are disposed directly beneath the upper bracket clamp 2 and their upper end edges are in contact with the lower outer side of the bracket clamp 2 to thereby give support to the clamp. The wide ends of the struts 5 and 6, secured to the lower portions of the upright support members 3 and 4, are respectively disposed along with the members within the lower bracket clamps 1.

A plurality of apertures 7 are provided in a vertical row in the wide portion of the struts 5 and 6 along the edges thereof located adjacent to the upright posts 3 and 4. The apertures 7 in each respective strut are evenly spaced from each other and each aperture 7 in strut 5 is aligned with a complemental aperture 7 in strut 6.

The outer portions of the lower bracket clamps 1 have central vertical openings of the general contour of the support posts 3 and 4 and converge in their outermost regions into straightly opposed flanges 8. The flanges 8 are separated on a central vertical plane to permit the brackets to be clamped to the upright posts 3 and 4 and to provide clearance for the struts 5 and 6.

To effect clamping action of the brackets 1, the opposed flanges 8 are provided with lower and upper apertures 9 and 10, respectively, through which pass the bolts 11 and 12. These apertures are vertically spaced to register with two of the apertures 7 in each strut 5 and 6.

The bolt 11 is disposed to pass through the aperture 9 in the outside flange 8 of one of the bracket clamps 1, thence through an aperture 7 of the desired height in one of the struts 5 or 6 and next through the aperture 9 in the inner part of flange 8 of the clamp. From there the bolt preferably passes through the aperture 9 in the inner flange 8 of the other clamp 1 and thence through an aperture 7 in the other strut, and out through the aperture 9 in the outside flange 8 of the respective clamp 1. The bolt 12 is similarly disposed in the apertures 10 and 7 in the respective clamps 1 and struts 5 and 6 at positions above and parallel to that of the bolt 11.

The bolts 11 and 12 are preferably threaded a substantial distance at each end and provided with nuts 13 threaded onto the inner portion of the threaded ends to engage the inner flange 8 of each clamp 1. Nuts 14 are threaded onto the outer ends of the bolts and engage the outer flange of each clamp with the struts 5 and 6 disposed between the respective nuts 13 and 14. The inner nuts 13 serve to space the members 3 and 4 from each other and provide abutments for the inner flanges 8 of the clamps. Outer nuts 14 upon being tightly threaded onto the bolts 11 and 12 press the outer flanges 8 of the brackets 1 inwardly to securely clamp the brackets around the lower portions of the upright posts 3 and 4.

The bolts 11 and 12 and the nuts 13 and 14 give additional strength to the upright members 3 and 4 to aid in offsetting the stresses to which these members are subjected by operation of the pulley and pulley belt on the machine tool drive unit. Separate bolts may be employed for the respective clamps 1, but in this case the additional strength and rigidity provided by bolts of the type of bolts 11 and 12 is not obtained.

The apertures 7 in the struts 5 and 6 are vertically spaced to provide convenient vertical adjustment of the supports and when engaged by the bolts prevent any possible slippage of the upright members in the clamps which may result in continuous service were the posts 3 and 4 held rigid by only the clamping pressure of the bracket clamps 1. The bolts 11 and 12 are of sufficient length to permit a substantial spacing of the lower brackets 1 if obstructions are present on the base of the machine tool.

The inner portions of the lower bracket clamps 1 to be secured to the machine tool are outwardly flanged and suitable bolt holes are provided in the upper and lower extremities of the flanged sections for insertion of the bolts 15 and 16. The bolts 15 bolt the lower parts of the brackets to the machine tool and the bolts 16 disposed above the bolts 15 bolt the upper parts of the bracket clamps to the machine tool.

The upper bracket clamp 2 is adapted to be secured to the machine tool drive unit 17 and preferably six evenly spaced projecting lugs 18 are disposed on one side of the drive unit for the connection of the clamp 2 to the unit in the manner to be described hereafter. Three of these lugs are located on a straight line evenly spaced from each other on the lower part of the side of the drive unit and three on the upper part, each of the last three being disposed vertically above one of the lower three lugs.

The upper bracket clamp 2 when assembled has four holes 19, 20, 21 and 22 disposed on a vertical axis, each hole being of sufficient circumference to permit encirclement of the upper end portions of the respective upright posts 3 and 4. To provide for the insertion of the support members 3 and 4 the clamp 2 is longitudinally separable through the center portion thereof.

The bolts 23, one disposed above the other in the solid region of the bracket 2 between the holes 21 and 22 serve merely to tighten the two halves of the clamp 2 together.

The long bolts 24 and the short bolts 25 are provided to secure the upper bracket 2 to the machine tool drive unit 17 by threading into the lugs 18 on the unit.

In the embodiment illustrated the long bolts 24 pass through the region between the holes 19 and 20 one above the other and are threaded into the lugs 18, whereas the short bolts 25 are threaded into lugs 18 by countersinking them in the inner side of the clamp at the hole 21, one being vertically disposed above the other. The hole 20 is illustrated as disposed between the positions of the long bolts 24 and the short bolts 25.

In adjusting the position of the drive unit the bracket may be turned over or reversed so that the bolts 25 will be threaded into the end lugs 18 at the opposite end of the drive unit from those into which they were previously threaded. Also the bracket may be moved endwise to bolt onto different lugs 18, the latter being spaced apart a distance equal to the spacing of bolts 24 and 25, or the drive unit may be moved endwise relative to the bracket to bolt onto different lugs. In any event the upright posts 3 and 4 pass through two of the holes 19, 20, 21 and 22, respectively, depending upon which holes are aligned with the central openings in the lower clamps 1.

The bracket clamp 2 is provided for lateral adjustment as described to permit lateral movement of the support. By providing for lateral movement of the support as described and by spacing the holes 19, 20, 21 and 22 on two inch centers, approximately every inch of a distance equal to one and one-half times the length of the clamp 2 is available for location of the support. This provides a considerable area for location of the lower brackets 1 on the machine tool in the event that obstructions prevent the location and securing of the lower brackets in an ordinary position on the machine tool.

In assembling the support with a machine tool and drive unit, the lower bracket clamps 1 are first bolted to the machine tool at a suitable location by threading the bolts 15 and 16 into the base of the machine tool. The clamps 1 should be spaced apart a distance to provide for a spacing of the posts 3 and 4 equal to the spacing of any two holes in clamp 2. The location of the lower bracket clamps 1 determines the location of the bracket 2 on the lugs of the machine tool drive unit, as two of the vertical holes in the bracket 2 must be in alignment with the openings in the bracket clamps 1 for insertion of the upright support posts 3 and 4 therebetween and at the same time the belt pulley of the drive unit must be in alignment with the belt pulley on the machine.

The steps of assembly after the clamps 1 are secured may differ. The upright posts 3 and 4 may first loosely be disposed within the lower bracket clamps by insertion of either one of the bolts 11 and 12 through the holes provided in the bracket clamps and the struts secured to the posts.

The machine tool drive unit is next positioned with the clamp 2 secured to the upper ends of the posts. Then the bolt 11 or 12 is removed and the drive unit raised to a position of reasonable tightness of the drive belt. The bolts 11 and 12 are then inserted in the clamps 1 and through the respective apertures 7 in struts 5 and 6 in such a manner that the nuts 13 are threaded onto the inner parts of the threaded end portions of the bolts. The nuts 14 are next threaded onto the outer threaded ends of the bolts with the struts 5 and 6 disposed between the respective nuts 13 and 14 to thereby securely clamp the posts and struts within the brackets 1.

The machine tool drive unit may be supported at different heights by adjusting the upright posts 3 and 4 up or down within the lower brackets and holding the posts at the adjusted positions by disposing the bolts 11 and 12 in holes of different heights in the respective struts 3 and 4.

The drive unit may also be supported at different positions on a plane parallel to the bed of the machine being driven by the unit. To accomplish this the bracket 2 may be secured to the middle and one outside lug 18 of the unit or to the middle and the other outside lug 18 of the unit. Either the bracket 2 or the drive unit may be moved endwise relative to each other, but in either case the middle lug 18 on the drive unit is always employed to receive one of the bolts securing the clamp to the unit unless more than three sets of lugs are employed.

If obstructions on the machine tools with which the drive unit is employed require different locations of the lower bracket clamps 1 the posts passing between these clamps and the clamp 2 may be disposed within the different holes provided by clamp 2. The posts may be disposed within the holes 19 and 20, 19 and 21 or 19 and 22. Or they may be placed in holes 20 and 21, 20 and 22, or 21 and 22. These respective holes of the clamp 2 may be located at different positions parallel to the plane of the bed of the driven machine in the event that the bracket is reversed or moved endwise relative to the drive unit and then secured to a different set of lugs on the unit or in the event that the drive unit is moved endwise relative to the bracket and secured by a different set of lugs.

The support described has a high degree of utility as it is subject to adjustment laterally as well as in height. This adapts the invention for use as a support for a machine tool drive unit with substantially all machine tools with which the drive unit may be employed. The support is also economical to construct and compact to handle in shipping and assembling.

Various embodiments of the invention may be made within the scope of the invention as set forth in the accompanying claims.

I claim:

1. A machine tool drive unit support comprising lower bracket clamps secured to the side of a machine tool, an upper bracket clamp secured to a machine tool drive unit, horizontally spaced upright posts disposed between and securely clamped by said brackets, means providing for movement of the posts up and down to support the drive unit at different heights, and means providing for movement of the upper bracket clamp horizontally, independently of said posts, to support the drive unit at different horizontal positions relative to said machine tool.

2. In a machine tool drive unit support, a plurality of spaced-apart upright posts, a truss support for said posts provided by struts secured to one side thereof, each strut having a plurality of corresponding evenly spaced apertures in a vertical row to receive bolts to hold the unit in different positions of vertical adjustment by movement of said posts and struts and each bolt passing through corresponding apertures in the several struts.

3. In a machine tool drive unit support, a lower bracket clamp, a plurality of upright posts having struts secured thereto, each strut having a plurality of corresponding evenly spaced apertures on a vertical row to receive bolts for vertically adjusting the support, nuts threaded onto the bolts at positions inside the struts to space the said upright posts, and nuts threaded onto the outer ends of said bolts to clamp the said upright posts and struts within the lower bracket clamp.

4. In a machine of the class described, a plurality of upright posts having their upper portions clamped within a bracket clamp secured to a machine tool drive unit and their lower portions clamped within bracket clamps secured to a machine tool, struts disposed directly beneath said upper bracket clamp to support the same and having gradually increasing width toward the lower bracket clamps to thereby increase the support strength of said upright posts.

5. A machine tool drive unit support having a bracket clamp secured to a machine tool drive unit and separable into two halves on a longitudinal plane relative to said drive unit, a plurality of upright posts, said bracket having a plurality of holes on a vertical axis at laterally spaced positions along the dividing line of the two halves thereof and of sufficient size to receive said upright posts, and bolts to clamp said posts within said bracket.

6. A machine tool drive unit support having a bracket clamp, a plurality of upright posts, said bracket clamp having a plurality of holes disposed on a vertical axis at spaced positions to receive said posts, and providing for the clamping within said bracket of said posts at predetermined horizontal locations relative to said bracket, and a plurality of lugs disposed on a machine tool drive unit to furnish various positions at which said clamp may be secured to said unit and provide for endwise movement of the unit and bracket clamp relative to each other.

7. A machine tool drive unit support having a bracket clamp, a plurality of upright posts, said bracket clamp having holes disposed on vertical axes at spaced positions to receive said posts, and providing for the clamping within said bracket of said posts, and a plurality of lugs disposed on a machine tool drive unit and spaced apart with an active lug disposed to register with a hole in the clamp and a second active lug disposed to register with a bolt passing between two holes in the clamp to provide for reversal of the clamp in its attachment to the machine tool drive unit.

8. In a machine of the class described, a plurality of upright posts having their upper portions clamped within a bracket clamp secured to a machine tool drive unit and their lower portions clamped within bracket clamps secured to a machine tool, and fins secured to the upright posts with their upper ends disposed directly beneath said upper bracket clamp to support the same, and their lower ends secured to said lower bracket clamp to truss support said upright posts in service.

9. In a machine of the class described, a plurality of upright posts having their upper portions clamped within a bracket clamp secured to a machine tool drive unit and their lower portions clamped within bracket clamps secured to a machine tool, and fins on said posts extending between said upper clamp and said lower clamps engaging said clamps to limit the relative vertical positions of said posts and upper clamp and provide a truss support for said posts.

10. In a machine of the class described, a plurality of upright posts having their upper portions clamped within a bracket clamp secured to a machine tool drive unit and their lower portions clamped within bracket clamps secured to a machine tool, and longitudinal fins secured to the sides of the posts to limit the relative vertical positions of the posts and the upper and lower clamps and to provide a truss support for said posts.

11. A machine tool drive unit support having a bracket clamp, a plurality of upright posts, said bracket clamp having a plurality of holes disposed on vertical axes at horizontally spaced positions to selectively receive said posts and providing for the clamping of said posts within said brackets at predetermined locations relative to the latter, and means on said drive unit to furnish several positions at which said clamp may be secured to said unit and provide for endwise movement of the unit and bracket clamps relative to each other.

WILLIAM C. HEATH.